(12) United States Patent
Song (10) Patent No.: US 11,763,992 B2
(45) Date of Patent: Sep. 19, 2023

(54) ELECTRONIC COMPONENT

(71) Applicant: SAMSUNG ELECTRO-MECHANICS CO., LTD., Suwon-si (KR)

(72) Inventor: Young Ah Song, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 49 days.

(21) Appl. No.: 17/514,274

(22) Filed: Oct. 29, 2021

(65) Prior Publication Data

US 2022/0208461 A1    Jun. 30, 2022

(30) Foreign Application Priority Data

Dec. 31, 2020    (KR) .......................... 10-2020-0189097

(51) Int. Cl.
| | | |
|---|---|---|
| *H01G 4/232* | (2006.01) | |
| *H01G 4/30* | (2006.01) | |
| *H01G 4/012* | (2006.01) | |

(52) U.S. Cl.
CPC ............. *H01G 4/2325* (2013.01); *H01G 4/30* (2013.01); *H01G 4/012* (2013.01)

(58) Field of Classification Search
CPC ........ H01G 4/2325; H01G 4/30; H01G 4/012; H01G 4/232; H01G 4/248
See application file for complete search history.

(56) References Cited

U.S. PATENT DOCUMENTS

| | | | |
|---|---|---|---|
| 8,941,972 B2 * | 1/2015 | Park ..................... | H01G 4/2325 361/321.1 |
| 11,367,574 B2 * | 6/2022 | Masunari ............. | H01G 4/1209 |
| 11,393,627 B2 * | 7/2022 | Yun ...................... | H01G 4/2325 |
| 11,574,773 B2 * | 2/2023 | Yi ......................... | H01G 4/2325 |
| 2009/0190285 A1 * | 7/2009 | Kusano ................. | H01G 4/30 361/321.4 |
| 2011/0157767 A1 * | 6/2011 | Hur ....................... | H01G 4/01 361/303 |
| 2013/0050896 A1 * | 2/2013 | Park ..................... | H01G 4/228 361/321.1 |
| 2013/0120898 A1 * | 5/2013 | Park ..................... | H01G 4/30 252/514 |

(Continued)

FOREIGN PATENT DOCUMENTS

| | | |
|---|---|---|
| KR | 10-2014-0012322 A | 2/2014 |
| KR | 10-2019-0135232 A | 12/2019 |

*Primary Examiner* — Dion R. Ferguson
(74) *Attorney, Agent, or Firm* — Morgan, Lewis & Bockius LLP (57) ABSTRACT

An electronic component includes: a body including a stack structure formed of a plurality of dielectric layers and internal electrodes alternately stacked with the dielectric layers interposed therebetween; and an external electrode disposed outside the body, connected to the internal electrode, and including conductive metal and glass, in which the external electrode includes a first electrode layer connected to the internal electrode and a second electrode layer disposed on the first electrode layer, an area proportion of the glass of the first electrode layer is greater than that of the glass of the second electrode layer, and a thickness of the second electrode layer is 6 μm or more.

16 Claims, 6 Drawing Sheets

(56) References Cited

U.S. PATENT DOCUMENTS

| | | | |
|---|---|---|---|
| 2013/0201600 A1* | 8/2013 | Nishisaka | H01G 4/005 361/301.4 |
| 2013/0201601 A1* | 8/2013 | Nishisaka | H01G 4/306 361/301.4 |
| 2014/0002950 A1* | 1/2014 | Gu | H01G 4/005 29/25.42 |
| 2014/0022689 A1* | 1/2014 | Kwag | H01G 4/30 361/301.4 |
| 2014/0022691 A1* | 1/2014 | Kwag | H01G 4/12 361/301.4 |
| 2014/0146437 A1* | 5/2014 | Lee | H01G 4/2325 361/301.4 |
| 2017/0271083 A1* | 9/2017 | Makino | H01G 4/30 |
| 2018/0286583 A1* | 10/2018 | Onoue | H01G 4/012 |
| 2019/0362894 A1 | 11/2019 | Choi et al. | |
| 2020/0303124 A1* | 9/2020 | Masunari | H01G 4/232 |
| 2022/0208461 A1* | 6/2022 | Song | H01G 4/2325 |

* cited by examiner

ELECTRONIC COMPONENT

CROSS-REFERENCE TO RELATED APPLICATION(S)

This application claims benefit of priority to Korean Patent Application No. 10-2020-0189097 filed on Dec. 31, 2020 in the Korean Intellectual Property Office, the disclosure of which is incorporated herein by reference in its entirety.

BACKGROUND

1. Field

The present relates to an electronic component.

2. Description of Related Art

A multilayer ceramic capacitor (MLCC), an electronic component, is a chip-type condenser mounted on printed circuit boards of several electronic products such as an image display apparatus, for example, a liquid crystal display (LCD), a plasma display panel (PDP), or the like, a computer, a smartphone, a cellular phone, and the like, to serve to charge or discharge electricity therein or therefrom.

The multilayer ceramic capacitor may be used as components of various electronic apparatuses since it is relatively small, implements high capacitance, and is easily mounted. In particular, as various electronic devices such as computers and mobile devices become smaller and higher output, the use of the multilayer ceramic capacitors is continuously increasing.

In general, in the electronic component such as the multilayer ceramic capacitor, an internal electrode may be provided inside a ceramic element made of a ceramic material, and an external electrode may be provided outside the ceramic element to be connected to the internal electrode, thereby implementing capacitance. In this case, plating may be performed on a surface of the external electrode to mount the electronic component on a printed circuit board and the like, and thus, a plating solution may erode some of the components of the external electrode, thereby reducing the reliability of the electronic component.

Accordingly, even if the surface of the external electrode is treated with the plating solution, there is a need for a technology capable of minimizing erosion of the external electrode to secure durability and moisture resistance reliability of the electronic component.

SUMMARY

An aspect of the present disclosure may provide an electronic component including an external electrode in which erosion of a plating solution is suppressed.

According to an aspect of the present disclosure, an electronic component includes: a body including a stack structure formed of a plurality of dielectric layers and internal electrodes alternately stacked with the dielectric layers interposed therebetween; and an external electrode disposed outside the body, connected to the internal electrode, and including conductive metal and glass, in which the external electrode includes a first electrode layer connected to the internal electrode and a second electrode layer disposed on the first electrode layer, an area proportion of the glass of the first electrode layer is greater than that of the glass of the second electrode layer, and a thickness of the second electrode layer is 6 μm or more.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Defining directions in order to clearly describe exemplary embodiments in the present disclosure, X, Y and Z in the drawings refer to a length direction, a width direction, and a thickness direction of an electronic component, respectively.

In addition, in the present specification, a length direction may be used as the same concept as an X direction or a second direction, a width direction may be used as the same concept as a Y direction or a third direction, and a thickness direction may be used as the same concept as a Z direction, a first direction, or a stacking direction, respectively.

Electronic Component

Figure 1:
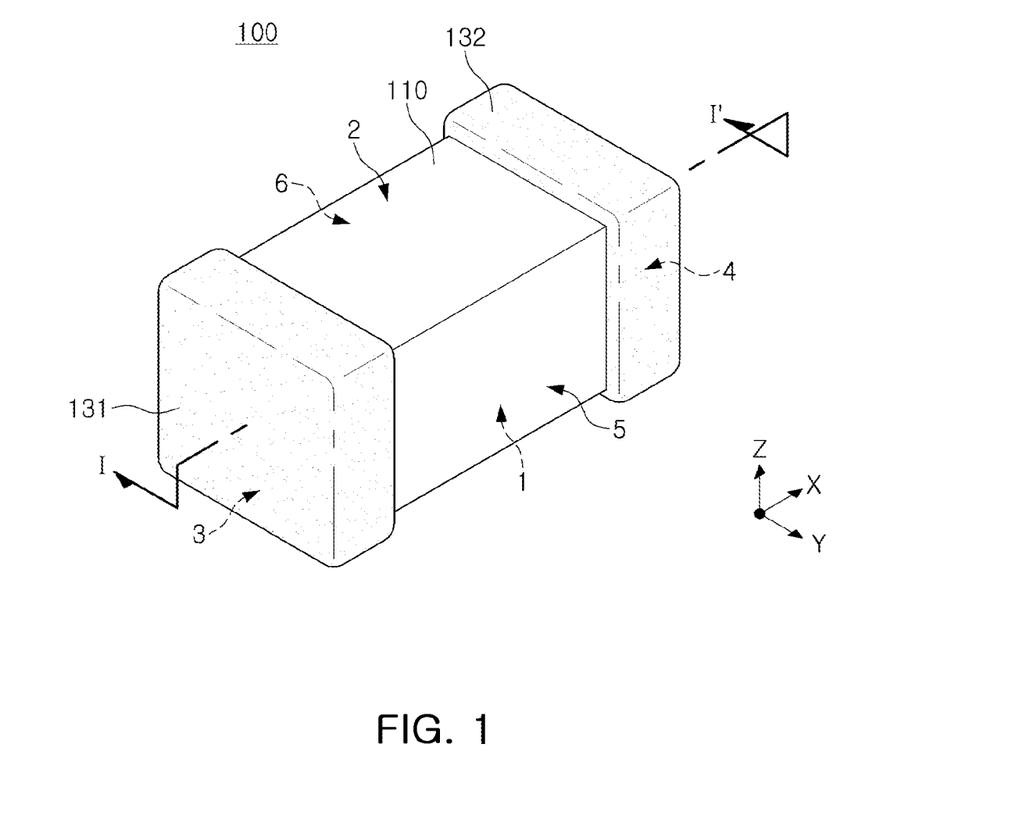
FIG. 1 is a perspective view schematically illustrating an electronic component according to an exemplary embodiment in the present disclosure.
Figure 2:
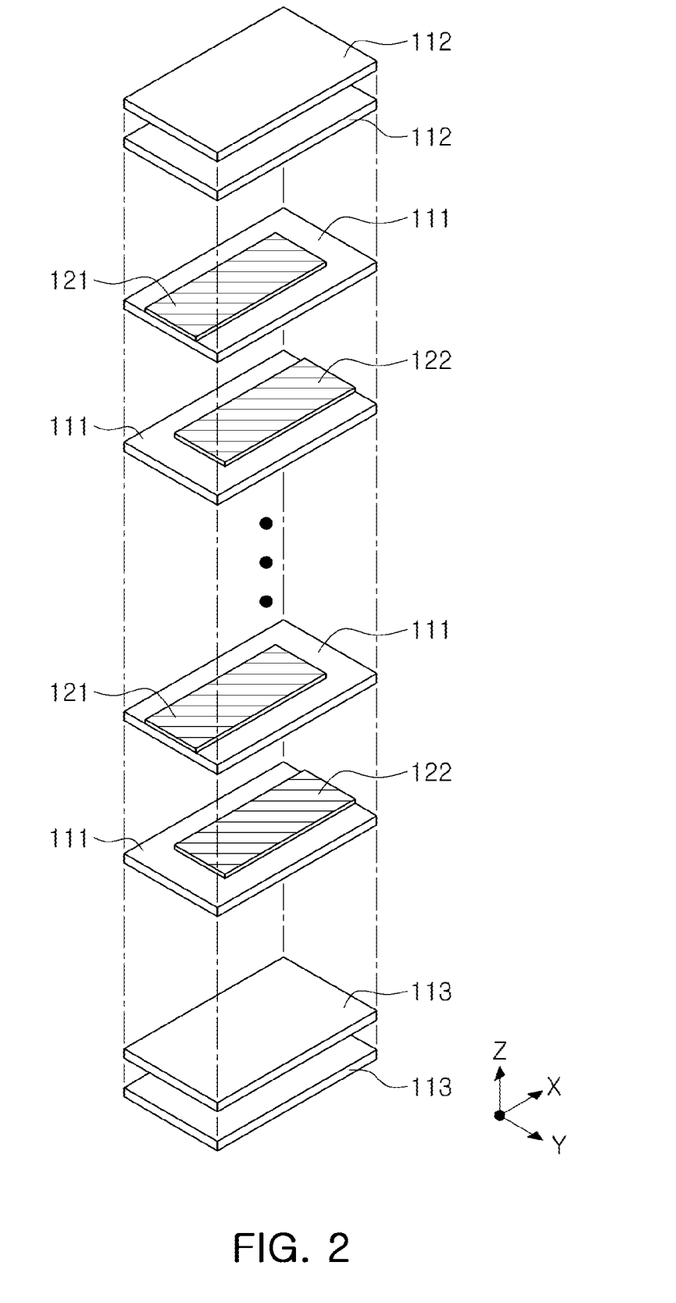
FIG. 2 is an exploded perspective view of a body in which a dielectric layer and an internal electrode are stacked according to an exemplary embodiment in the present disclosure.
Figure 3:
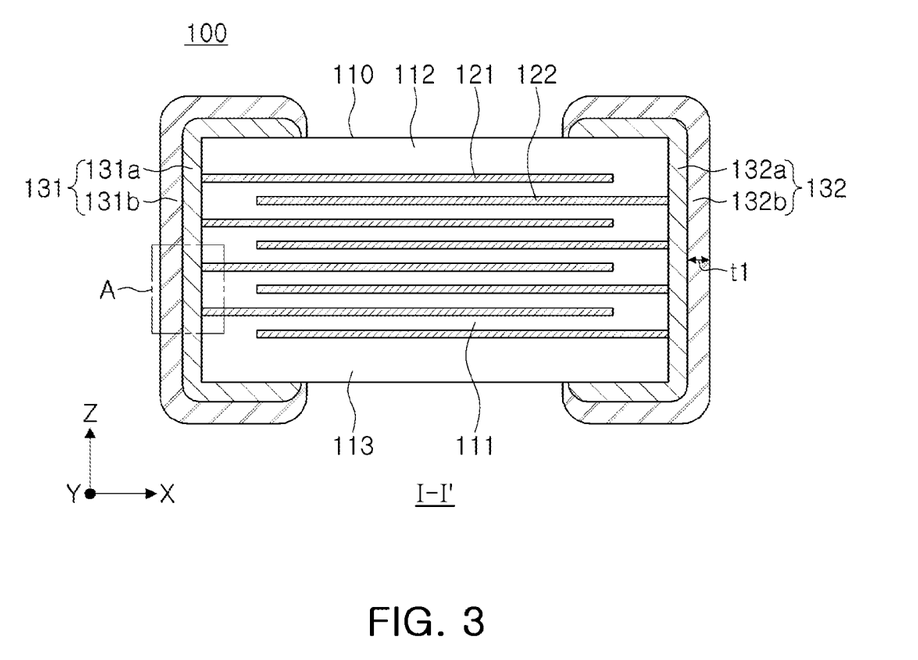
FIG. 3 is a cross-sectional view of the electronic component taken along line I-I' of FIG. 1.
Figure 4:
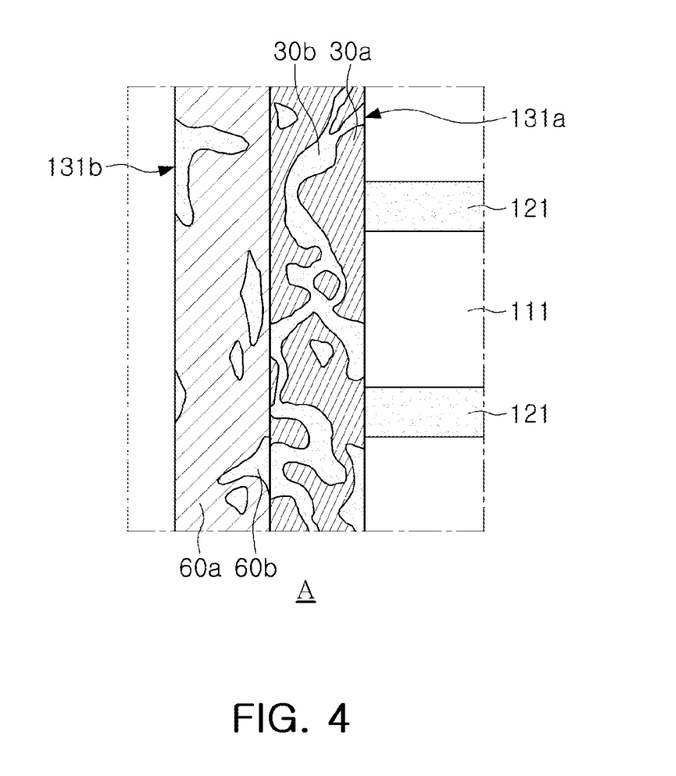
FIG. 4 is a schematic enlarged view of region A of FIG. 3.

FIG. 1 is a perspective view schematically illustrating an electronic component according to an exemplary embodiment in the present disclosure, FIG. 2 is an exploded perspective view of a body in which a dielectric layer and an internal electrode are stacked according to an exemplary embodiment in the present disclosure, FIG. 3 is a cross-sectional view taken along line I-I' of FIG. 1, and FIG. 4 is a schematic enlarged view of region A of FIG. 3.

Hereinafter, an electronic component according to an exemplary embodiment in the present disclosure will be described with reference to FIGS. 1 to 4.

An electronic component 100 according to an exemplary embodiment in the present disclosure may include a body 110 including a dielectric layer 111 and internal electrodes 121 and 122, and external electrodes 131 and 132 disposed outside the body 110, connected to the internal electrodes 121 and 122, and including conductive metal and glass.

The external electrodes 131 and 132 include first electrode layers 131a and 132a connected to the internal electrodes 121 and 122, respectively, and second electrode layers 131b and 132b disposed on the first electrode layers 131a and 132a, respectively. In this case, area proportions of the glass of the first electrode layers 131a and 132a may be greater than those of the glass of the second electrode layers 131b and 132b.

The body 110 may include the plurality of dielectric layers 111 and the plurality of internal electrodes 121 and 122 alternately stacked with each of the dielectric layers 111 interposed therebetween.

A shape of the body 110 is not particularly limited, but may be a hexahedral shape or a shape similar to the hexahedral shape, as illustrated in FIG. 1. In addition, the body 110 does not have a hexahedral shape having a perfect straight line due to shrinkage of ceramic powders included in the body 110 in a sintering process, but may have substantially the hexahedral shape.

The body 110 may have first and second surfaces 1 and 2 facing each other in a thickness direction (Z direction), third and fourth surfaces 3 and 4 connected to the first and second surfaces 1 and 2 and facing each other in a second direction (X direction), and fifth and sixth surfaces 5 and 6 connected to the first to fourth surfaces 1, 2, 3, and 4 and facing each other in a third direction (Y direction).

The plurality of dielectric layers 111 forming the body 110 may be in sintered state, and adjacent dielectric layers 111 may be integrated with each other so that boundaries therebetween are not readily apparent without using a scanning electron microscope (SEM).

A raw material for forming the dielectric layer 111 is not particularly limited as long as sufficient capacitance may be obtained. For example, a barium titanate-based material, a lead composite perovskite-based material, a strontium titanate-based material, or the like may be used.

In addition, a material forming the dielectric layer 111 may be a material in which adding various ceramic additives, organic solvents, plasticizers, binders, dispersants, and the like are added to powders such as barium titanate ($BaTiO_3$), according to an object of the present disclosure.

The body 110 may include a capacitance forming part that forms capacitance, including the first and second internal electrodes 121 and 122 that are disposed in the body 110 and are disposed to face each other with the dielectric layer 111 disposed therebetween, and cover parts 112 and 113 that are disposed above and below the capacitance forming part.

The capacitance forming part is a part that contributes to the formation of capacitance of the electronic component 100 and may be formed by repeatedly stacking the plurality of first and second internal electrodes 121 and 122 with the dielectric layer 111 disposed therebetween.

The upper cover part 112 and the lower cover part 113 may not include an internal electrode, and may be formed of the same material as the dielectric layer 111, and basically serve to prevent the internal electrode from being damaged due to physical or chemical stress. Referring to FIG. 2, the upper cover part 112 and the lower cover part 113 may be formed by stacking a single dielectric layer or two or more dielectric layers on the upper and lower surfaces of the capacitor forming portion in the vertical direction, respectively.

The internal may include a first internal electrode 121 and a second internal electrode 122 alternately disposed to face each other with the dielectric layer 111 disposed therebetween.

Referring to FIG. 2, the body 110 may be formed by alternately stacking the dielectric layer 111 on which the first internal electrode 121 is printed and the dielectric layer 111 on which the second internal electrode 122 is printed in the thickness direction (Z direction) and then sintering the dielectric layer 111.

The first and second internal electrodes 121 and 122 may be electrically insulated from each other by the dielectric layer 111 disposed therebetween.

Referring to FIGS. 1 to 3, the first and second internal electrodes 121 and 122 may be exposed to the third and fourth surfaces 3 and 4 of the body 110, respectively. More specifically, the first internal electrode 121 may be spaced apart from the fourth surface 4 and exposed through the third surface 3, and the second internal electrode 122 may be spaced apart from the third surface 3 and exposed through the fourth surface 4. Accordingly, the first internal electrode 121 may be connected to the first electrode layer 131, and the second internal electrode 122 may be connected to the second electrode layers 132.

The first external electrode 131 may be disposed on the third surface 3 of the body 110 and connected to the first internal electrode 121, and the second external electrode 132 may be disposed on the fourth surface 4 of the body and connected to the second internal electrode 122.

According to the configuration as described above, when a predetermined voltage is applied to the first and second external electrodes 131 and 132, electric charges may be accumulated between the first and second internal electrodes 121 and 122. In this case, the capacitance of the electronic component 100 may be in proportion to an overlapped area of the first and second internal electrodes 121 and 122 overlapping each other in the Z direction in an active region.

In addition, the material forming the first and second internal electrodes 121 and 122 is not particularly limited, and the first and second internal electrodes 121 and 122 may be formed of a conductive paste formed of one or more of, for example, a noble metal material, such as a platinum (Pt), palladium (Pd), and a palladium-silver (Pd—Ag) alloy, nickel (Ni), and copper (Cu).

In this case, the method of printing the conductive paste may include a screen printing method, a gravure printing method, or the like, but is not limited thereto.

The external electrodes 131 and 132 may be disposed outside the body 110, and may be connected to the internal electrodes 121 and 122, respectively. As illustrated in FIG. 3, the external electrodes may include the first external electrode 131 and the second external electrode 132 connected to the first and second internal electrodes 121 and 122, respectively.

The first and second external electrodes 131 and 132 may be electrically connected to the first and second internal electrodes 121 and 122, respectively, in order to form capacitance, and the second external electrode 132 may be connected to a different potential from the first external electrode 131.

The first external electrode 131 may be disposed on the third surface 3 of the body 110 and portions of the first, second, fifth and sixth surfaces 1, 2, 5, and 6 of the body 110. In more detail, the first external electrode 131 may include a connection part disposed on the third surface 3 of the body 110 and a band part extending from the connection part to the portions of the first, second, fifth and sixth surfaces 1, 2, 5, and 6 of the body.

Similarly, the second external electrode 132 may be disposed on the fourth surface 4 of the body 110 and the portions of the first, second, fifth and sixth surfaces 1, 2, 5, and 6 of the body 110. In more detail, the second external electrode 132 may include a connection part disposed on the fourth surface 4 of the body 110 and a band part extending from the connection part to the portions of the first, second, fifth and sixth surfaces 1, 2, 5, and 6 of the body.

Meanwhile, the exemplary embodiment in the present disclosure describes the structure in which the electronic component 100 has two external electrodes 131 and 132, but the number, shapes, or the like, of external electrodes 131 and 132 may be changed depending on the shapes of the internal electrodes 121 and 122 or other purposes.

The external electrodes 131 and 132 according to the exemplary embodiment in the present disclosure include the conductive metal and glass.

The external electrodes 131 and 132 may include first electrode layers 131a and 132a, respectively, connected to the internal electrodes 121 and 122, respectively, and second electrode layers 131b and 132b disposed on the first electrode layers 131a and 132a, respectively, and the area proportions of the glass of the first electrode layers 131a and 132a may be greater than those of the glass of the second electrode layers 131b and 132b.

In the present specification, an area proportion of a component may mean an area proportion of a corresponding component to a total area of a specific component, and may mean an average area proportion.

That is, the area proportions of the glass of the first electrode layers 131a and 132a may mean area proportions of the glass component included in the first electrode layers 131a and 132a with respect to the total area of the first electrode layers 131a and 132a. In addition, the area proportions of the glass of the second electrode layers 131b and 132b may mean the area proportions of the glass component included in the second electrode layers 131b and 132b with respect to the total area of the second electrode layers 131b and 132b.

In this case, the method of measuring the area proportion of the glass may be various, but may include, for example, a method of selecting a plurality of points from one end surface of the electronic component 100 and measuring proportions of each area occupied by the glass in the total area of each point with respect to a total area of the selected points to calculate an arithmetic mean.

On the other hand, the method of calculating specific values for the area proportions of the glass of the first electrode layers 131a and 132a and the second electrode layers 131b and 132b will be described in more detail later while explaining an experimental example in Table 1 below.

The first electrode layers 131a and 132a may be disposed on the outer surface of the body 110 and may be connected to the internal electrodes 121 and 122, respectively. The first electrode layers 131a and 132a may include the conductive metal and glass.

Referring to FIG. 4, the conductive metal may form a first conductive metal part 30a in the first electrode layer 131a, and the glass may form a first glass part 30b around the first conductive metal part 30a.

The area proportions occupied by the first conductive metal part 30a and the first glass part 30b may vary in the first electrode layers 131a and 132a, respectively. As an example, the first electrode layers 131a and 132a may include a first conductive metal part 30a, having an area proportion of 80%, and a first glass part 30b, having an area proportion of 20% with respect to a total area of the first electrode layers 131a and 132a.

The conductive metal disposed on the first conductive metal part 30a may include copper (Cu). However, the conductive metal is not limited to Cu, and various materials having excellent conductivity such as nickel (NI) and a copper-nickel (Cu—Ni) alloy may be used without limitation.

The conductive metal may serve to impart conductivity to the external electrodes 131 and 132, and thus, when the electronic component 100 is mounted on a printed circuit board and connected to an electrode pad, the conductive metal may be applied with a voltage from the external electrodes 131 and 132 and may transmit the voltage to the internal electrodes 121 and 122.

The glass included in the first glass part 30b may serve to improve adhesion and moisture resistance of the external electrodes 131 and 132. That is, the adhesion between the first electrode layers 131a and 132a and the dielectric layer 111 of the body 110 may be maintained by the glass component.

The glass disposed in the first glass part 30b may be a composition in which oxides are mixed, and is not particularly limited, but may include one or more selected from the group consisting of silicon oxide, boron oxide, aluminum oxide, transition metal oxide, alkali metal oxide, and alkaline earth metal oxide.

At this time, the composition of the glass described above may have a property of dissolving in an acidic solution, and thus, erosion may occur in the glass component in the process of forming an acidic plating layer such as a Ni plating solution on the electrode layer. The erosion of the first electrode layers 131a and 132a may provide a penetration path for moisture, thereby causing a problem of deteriorating the reliability of the electronic component 100.

Accordingly, the external electrodes 131 and 132 according to the exemplary embodiment in the present disclosure may be provided with the second electrode layers 131b and 132b disposed on the first electrode layers 131a and 132a, thereby suppressing the first electrode layers 131a and 132a from eroding.

The second electrode layers 131b and 132b may be disposed on the first electrode layers 131a and 132a, respectively.

Since the area proportions of the glass of the second electrode layers 131b and 132b are smaller than those of the glass of the first electrode layers 131a and 132a, the erosion of the plating solution applied on the second electrode layers 131b and 132b may be suppressed. Accordingly, the first electrode layers 131a and 132a including more glass than that of the second electrode layers 131b and 132b may be protected, thereby preventing the plating breakage and reducing the reliability of the electronic component 100.

In the present specification, the "plating break" may mean that the external electrodes 131 and 132 disposed outside the body 110 are partially eroded, and thus the body 110 is exposed to the outside in a portion of the regions where the external electrodes 131 and 132 are formed.

As illustrated in FIGS. 1 to 3, in the case of the electronic component 100 having the external electrodes 131 and 132 disposed on the third and fourth surfaces 3 and 4 and portions of the first, second, fifth, and sixth surfaces 1, 2, 5, and 6 of the body 110, the erosion of the external electrodes 131 and 132 due to the plating solution may be mostly caused at each edge of the third and fourth surfaces 3 and 4 of the body 110.

Therefore, in the case of the experimental example according to the exemplary embodiment in the present disclosure, which will be described later, in measuring the plating breakage rate of the electronic component 100, the proportion of the number of edges of the external electrodes 131 and 132 where the plating breakage occurs may be calculated.

As an example, after forming the Ni plating layer for 25 electronic components 100, by checking the number of edges where the plating breakage occurs among a total of 200 edges in which eight edges included in each electronic component 100 are summed, the plating breakage rate may be calculated.

The second electrode layers 131b and 132b may include conductive metal. Referring to FIG. 4, the conductive metal may form a second conductive metal part 60a in the second electrode layer 131b.

The conductive metal disposed on the second conductive metal part 60a may include copper (Cu). However, the conductive metal is not limited to Cu, and various materials having excellent conductivity such as nickel (Ni) and a copper-nickel (Cu—Ni) alloy may be used without limitation.

The conductive metal may serve to impart conductivity to the external electrodes 131 and 132, and thus, when the electronic component 100 is mounted on a printed circuit board and connected to an electrode pad, the conductive metal may be applied with a voltage from the external electrodes 131 and 132 and may transmit the voltage to the internal electrodes 121 and 122.

The second electrode layers 131b and 132b may include glass. Referring to FIG. 4, the glass may form a second glass part 60b in the second electrode layer 131b.

However, the second electrode layers 131b and 132b do not necessarily include the glass, and the second electrode layers 131b and 132b may be formed using a paste for external electrodes not including glass. That is, the second glass part 60b may not appear on the second electrode layers 131b and 132b.

The glass disposed in the second glass part 60b may be a composition in which oxides are mixed, and is not particularly limited, but may include one or more selected from the group consisting of silicon oxide, boron oxide, aluminum oxide, transition metal oxide, alkali metal oxide, and alkaline earth metal oxide.

The area proportions occupied by the second conductive metal part 60a and the second glass part 60b may vary in the second electrode layers 131b and 132b, respectively. However, according to the exemplary embodiment in the present disclosure, the area proportion of the second glass part 60b may be smaller than that of the first glass part 30b.

As an example, the second electrode layers 131b and 132b may include the second conductive metal part 60a having an area proportion of 86% to 100% and the second glass part 60b having an area proportion of 0 to 14% with respect to a total area of the second electrode layers 131b and 132b.

As described above, since the proportion of the glass in the second electrode layers 131b and 132b is lower than that of the first electrode layers 131a and 132a, the erosion of the second electrode layers 131b and 132b may be minimized in the process of forming an acidic plating layer such as the Ni plating solution disposed on the second electrode layers 131b and 132b. Then, the erosion of the first electrode layers 131a and 132a disposed inside the second electrode layers 131b and 132b may also be prevented, and the deterioration in reliability of the electronic component 100 may be suppressed.

In addition, by disposing the second electrode layers 131b and 132b to protect the first electrode layers 131a and 132a, there is no need to reduce the proportion of the glass component of the first electrode layers 131a and 132a when manufacturing the electronic component 100 according to the exemplary embodiment of the present disclosure.

For reference, in the case of the first electrode layers 131a and 132a in direct contact with the surface of the body 110, when the proportion of the glass component in the first electrode layers 131a and 132a decreases, there is a problem in that the adhesion between the dielectric layer 111 and the first electrode layers 131a and 132a included in the body 110 decreases, and thus, the durability of the electronic component 100 deteriorates.

Therefore, by disposing the second electrode layers 131b and 132b according to the exemplary embodiment of the present disclosure, and making the component proportion of the glass of the first electrode layers 131a and 132a similar to or higher than the component proportion of the glass in the existing traditional external electrode, the occurrence of the plating breakage of the external electrodes 131 and 132 may be suppressed, and the adhesion of the first electrode layers 131a and 132a may be maintained high.

Meanwhile, the second electrode layers 131b and 132b according to the exemplary embodiment in the present disclosure may have a thickness t1 (see FIG. 3) in a predetermined range. For example, the thickness of the second electrode layers 131b and 132b may be 6 μm or more.

In the present specification, the "thickness" may mean a thickness of the member measured in a direction perpendicular to a surface of a member, and in particular, may mean an average thickness.

Specifically, the "average thickness" of the second electrode layer may mean an arithmetic mean of thicknesses measured at points where a point where the second electrode layer is disposed is divided into five at equal intervals in a Y direction, with respect to a cut plane cut parallel to an X-Y plane while passing through a center of the electronic component.

When the second electrode layers 131b and 132b having a relatively small area proportion of glass have a thickness less than a predetermined value, the function of protecting the first electrode layers 131a and 132a may not be sufficiently performed. That is, in the second electrode layers 131b and 132b formed with a thin thickness, even if the degree of erosion of the plating solution is small, there is a high possibility that a penetration path of moisture reaching the first electrode layers 131a and 132a may be formed. Accordingly, the plating solution may penetrate into the first electrode layers 131a and 132a to erode the glass included in the first electrode layers 131a and 132a, and the plating breakage by which a portion of the body 110 is exposed may occur.

On the other hand, when the second electrode layers 131b and 132b have a thickness greater than or equal to a predetermined value, even if a small amount of glass included in the second electrode layers 131b and 132b is partially eroded by the plating solution, there is a high possibility that the penetration path of moisture reaching the first electrode layers 131a and 132a may not be formed. Accordingly, the plating solution may not easily penetrate into the first electrode layers 131a and 132a, and the occurrence of the plating breakage may be suppressed.

Details of the thickness range of the second electrode layers 131b and 132b will be described below in more detail in experimental examples.

Figure 5:
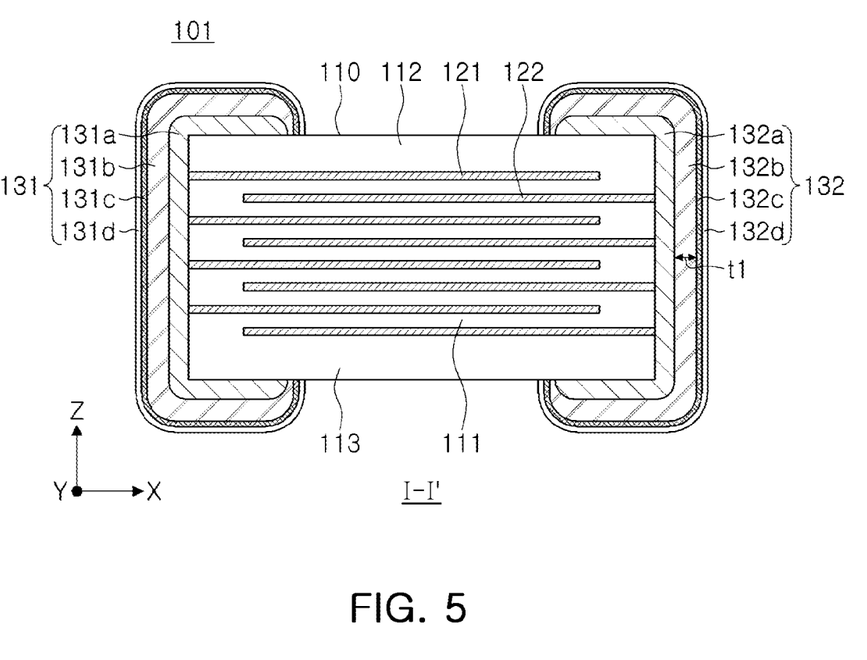
FIG. 5 is a cross-sectional view illustrating the electronic component of FIG. 3 to which a plating layer is added according to another exemplary embodiment in the present disclosure.

FIG. 5 is a cross-sectional view taken along line I-I' in which the plating layer is added to the electronic component of FIG. 3 according to another exemplary embodiment in the present disclosure.

Referring to FIG. 5, an electronic component 101 according to another embodiment in the present disclosure may include external electrodes 131 and 132 having a four-layer structure.

More specifically, the external electrodes 131 and 132 of the electronic component 101 may include first electrode layers 131a and 132a, second electrode layers 131b and 132b, first plating layers 131c and 132c, and second plating layers 131d and 132d.

Here, the features of the first electrode layers 131a and 132a and the second electrode layers 131b and 132b are the same as those of the electronic component 100 according to the exemplary embodiment described in FIGS. 1 to 4, and therefore, a duplicate description thereof will be omitted. Hereinafter, the first plating layers 131c and 132c and the second plating layers 131d and 132d corresponding to differences from the embodiments illustrated in FIGS. 1 to 4 will be described in detail.

The first plating layers 131c and 132c may be disposed on the second electrode layers 131b and 132b, respectively.

The first plating layers 131c and 132c may include a conductive metal. In this case, the conductive metal included in the first plating layers 131c and 132c may include Ni. For example, the first plating layers 131c and 132c may be formed by a plating solution containing components such as Ni (SO$_3$NH$_2$)$_2$ and NiCl$_2$.

Meanwhile, such a Ni plating solution may have acidity of pH 3 to 3.5, and therefore, when the Ni plating solution is applied on an electrode layer including glass, the electrode layer may erode, and as a result, the reliability of electronic components may deteriorate.

Accordingly, in the external electrodes 131 and 132 according to the exemplary embodiment in the present disclosure, as illustrated in FIG. 5, the second electrode layers 131b and 132b that does not include glass or includes only glass having a small area proportion are disposed between the first electrode layers 131a and 132a and the first plating layers 131c and 132c.

Then, the contact between the first electrode layers 131a and 132a including glass having a relatively large area proportion and the acidic plating solution forming the first plating layers 131c and 132c may be prevented, and thus, the erosion of the electrode layer may be suppressed.

The second plating layers 131d and 132d may be disposed on the first plating layers 131c and 132c, respectively.

The second plating layers 131d and 132d include a conductive metal. In this case, the conductive metal included in the second plating layers 131d and 132d may be different from the conductive metal included in the first plating layers 131c and 132c. For example, the conductive metal included in the second plating layers 131d and 132d may include Sn.

However, the conductive metal included in the first plating layers 131c and 132c and the second plating layers 131d and 132d is not limited to the above-described examples, and the plating layer may be formed using various conductive metals.

EXPERIMENTAL EXAMPLE

Table 1 below shows results of measuring the rate at which the plating breakage occurs when the Ni plating solution is applied on the second electrode layers 131b and 132b according to different area proportions of the conductive metal and glass included in the second electrode layers 131b and 132b.

The sum of the area proportion of Cu and the area proportion of glass of the first electrode layers 131a and 132a shown in Table 1 was equal to 100%. That is, other components than Cu and glass were controlled not to be included in the first electrode layers 131a and 132a of each chip whose area proportion was measured. Similarly, the sum of the area proportion of Cu and the area proportion of glass of the second electrode layers 131b and 132b shown in Table 1 was equal to 100%. That is, other components than Cu and glass were controlled not to be included in the second electrode layers 131b and 132b of each chip whose area proportion was measured.

More specifically, the chip used in the experiment of Table 1 equally includes the first electrode layers 131a and 132a including conductive metal Cu and glass in an area proportion of 80%:20%, respectively. In addition, the second electrode layers 131b and 132b were disposed on the first electrode layers 131a and 132a, and the plating breakage rate caused by applying the Ni plating solution on the finally formed second electrode layers 131b and 132b was measured.

The second electrode layers 131b and 132b used in the experiment contained conductive metal Cu, and experiments were conducted with different area proportions of Cu and glass, respectively. At this time, the thickness of each of the second electrode layers 131b and 132b was 10 μm.

The area proportions of Cu and glass of the first electrode layer shown in Table 1 were obtained by measuring the proportions of the areas occupied by the glass for each of the five selected points among the points where the first electrode layer is disposed, and calculating an arithmetic mean thereof, in the cut plane of each chip cut in the direction parallel to the X-Z plane from the center in the Y direction.

The area proportions of Cu and glass of the second electrode layer were obtained by measuring the proportions of the areas occupied by the glass for each of the five selected points among the points where the second electrode layer is disposed, and calculating the arithmetic mean thereof, in the cut plane of each chip cut in the direction parallel to the X-Z plane from the center in the Y direction.

In this case, the five selected points were each to have the same rectangle 20 μm in width and 20 μm in length, and were selected into one point located at the central point in the X direction in the cut planes and four points located at regular intervals by two pairs from both sides in the X direction therefrom.

In addition, by grasping the atypical boundary between Cu and glass from the image shot by magnifying the cut plane with a scanning electron microscope (SEM), the area proportion of Cu and the area proportion of glass could each be measured.

As a result of applying the Ni plating solution to each of 25 chips in Experimental Examples 1 to 5, the plating breakage rate shown in Table 1, the plating breakage rate shown in Table 1 was obtained by calculating the proportion of the number of edges where the plating breakage occurs among the edges of a total of 200 external electrodes. That is, the proportion was calculated by checking the number of edges exposed to the outside due to the erosion of the edge of the electrode layer.

TABLE 1

| Experimental Example | First electrode layer | | Second electrode layer | | Plating breakage rate (%) |
| --- | --- | --- | --- | --- | --- |
| | Area proportion of Cu (%) | Area proportion of glass (%) | Area proportion of Cu (%) | Area proportion of glass (%) | |
| 1 | 80 | 20 | 100 | 0 | 0 |
| 2 | 80 | 20 | 93 | 7 | 0 |

TABLE 1-continued

| | First electrode layer | | Second electrode layer | | |
|---|---|---|---|---|---|
| Experimental Example | Area proportion of Cu (%) | Area proportion of glass (%) | Area proportion of Cu (%) | Area proportion of glass (%) | Plating breakage rate (%) |
| 3 | 80 | 20 | 86 | 14 | 3 |
| 4* | 80 | 20 | 80 | 20 | 75 |
| 5* | 80 | 20 | 74 | 26 | 100 |

As shown in Table 1, it can be seen that in Experimental Examples 4 and 5 in which the area proportion of the glass of the second electrode layers 131b and 132b was 20% or more, the plating breakage rate increased sharply compared to Experimental Examples 1 to 3. That is, it can be seen in this experiment that since the glass area proportion of the first electrode layers 131a and 132a is set to 20%, when the area proportion of the glass of the second electrode layers 131b and 132b is smaller than that of the glass of the first electrode layers 131a and 132a, the effect of suppressing the plating breakage was clearly shown.

More specifically, in the case of Experimental Examples 1 to 3 in which the area proportion of the glass of the second electrode layers 131b and 132b was 14% or less, the plating breakage rate was very low, as 3% or less.

This is interpreted as a result of suppressing the erosion of the second electrode layers 131b and 132b in the process of forming the plating layer by the Ni plating solution because the second electrode layers 131b and 132b includes a low proportion of glass. In addition, this is interpreted that the occurrence of the plating breakage is suppressed because the plating solution does not penetrate the first electrode layers 131a and 132a disposed inside the second electrode layers 131b and 132b.

Since the plating breakage rate was rapidly changed between Experimental Example 3 where the glass area proportion of the second electrode layers 131b and 132b was 14% and Experimental Example 4 where the glass area proportion of the second electrode layers 131b and 132b was 20%, it may be difficult to ensure the effect of preventing the plating breakage in the area proportion of the glass having an intermediate value of 14% and 20% However, in the case of Experimental Example 3, the plating breakage rate was shown to be 3%, and it can be seen that the erosion of the electrode layer was significantly suppressed when compared to the first electrode layers 131a and 132a.

Accordingly, in the electronic component according to the embodiment of the present disclosure, the area proportion of the glass to the sum of the areas of the conductive metal and glass included in the second electrode layers 131b and 132b is 14% or less.

In addition, in the case of Experimental Examples 1 and 2 in which the area proportion of the glass of the second electrode layers 131b and 132b is 7% or less, the plating breakage rate was shown as 0%. That is, in the case of Experimental Examples 1 and 2, no plating breaks occurred at the edges included in each of the 25 chips.

Accordingly, in the electronic component according to the embodiment of the present disclosure, the area proportion of the glass to the sum of the areas of the conductive metal and glass included in the second electrode layers 131b and 132b is 7% or less.

In this case, as can be seen from Experimental Example 1, even when the second electrode layers 131b and 132b did not include glass, no plating breakage occurred, and as a result, the second electrode layers 131b and 132b did not include glass component.

Figure 6:
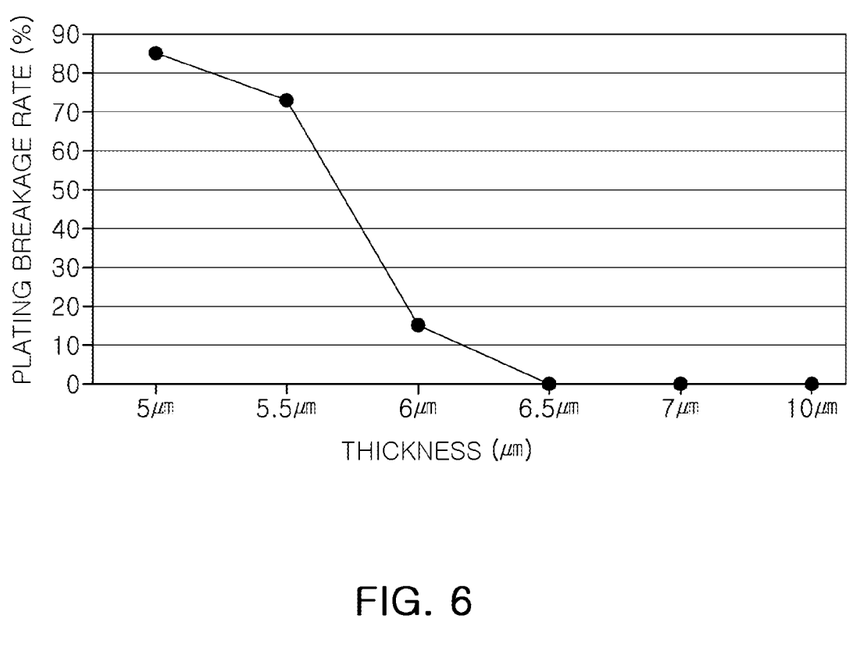
FIG. 6 is a graph illustrating a result of measuring a rate of occurrence of Ni plating breakage according to t1 (thickness of a second electrode layer) of FIGS. 3 and 5.

FIG. 6 is a graph illustrating a result of measuring the rate of occurrence of the Ni plating breakage according to t1 (thickness of the second electrode layer) of FIGS. 3 and 5.

In addition to the experiment of Table 1 above, FIG. 6 illustrates a result of measuring the rates of occurrence of the plating breakage, respectively, when the remaining conditions are the same as those of the experiment of Table 1 and only the thickness of the second electrode layers 131b and 132b is different. In this case, each of the experimental examples illustrated in FIG. 6 is that the area proportion of the Cu of the second electrode layers 131b and 132b is set to 100%, and the area proportion of the glass is set to 0%.

For reference, the thickness of the second electrode layers 131b and 132b indicated on the x axis of FIG. 6 is obtained by calculating the arithmetic mean of the thicknesses measured at points where a point where the second electrode layer is disposed is divided into five at equal intervals in the Y direction, with respect to the cut plane cut parallel to the X-Y plane while passing through the center of the electronic component.

Referring to FIG. 6, when the thickness of the second electrode layers 131b and 132b is 6 μm or more, it can be seen that the plating breakage rate sharply decreased compared to the experimental example in which the thickness of the second electrode layers 131b and 132b is 5.5 μm. That is, it can be seen that when the thickness of the second electrode layers 131b and 132b is 6 μm or more, the effect of suppressing the plating breakage is clearly exhibited.

This is interpreted, due to the effect of securing the thickness of the second electrode layers 131b and 132b, that erosion does not occur to the inside of the electrode layer even if a part of the glass included in the second electrode layers 131b and 132b is eroded by the plating solution. That is, when the thickness of each of the second electrode layers 131b and 132b is 6 μm or more, it is interpreted that the penetration path of moisture reaching the first electrode layers 131a and 132a is hardly formed.

On the other hand, in the experimental example in which each of the thickness of the second electrode layers 131b and 132b is less than 6 μm on the graph of FIG. 6, it can be seen that the plating breakage rate sharply increases to have a value of 70% or more.

This may mean the function of protecting the first electrode layers 131a and 132a may not be sufficiently performed when the second electrode layers 131b and 132b do not include glass, and have a thickness less than a predetermined value. That is, in the second electrode layers 131b and 132b formed with a thickness of less than 6 μm, it is interpreted that even if the degree of erosion of the plating solution is small, the penetration path of moisture reaching the first electrode layers 131a and 132a may be partially formed.

Accordingly, in the electronic component according to the exemplary embodiment in the present disclosure, the thickness of each of the second electrode layers 131b and 132b is 6 μm or more.

In addition, when each of the thickness of the second electrode layers 131b and 132b is 6.5 μm or more, the plating breakage rate was 0%. That is, when the thickness of each of the second electrode layers 131b and 132b is 6.5 μm or more, no plating breakage occurred at the edges included in each of the 25 chips.

Therefore, in order to more effectively prevent the plating breakage, in the electronic component according to the exemplary embodiment in the present disclosure, the thickness of each of the second electrode layers 131b and 132b is 6.5 µm or more.

Meanwhile, the upper limit of the thickness of the second electrode layers 131b and 132b is not particularly limited, but may have a thickness of 15 µm or less. That is, if the thickness of the second electrode layers 131b and 132b exceeds 15 µm, the total thickness of the external electrodes 131 and 132 may become too thick, and thus may be limited to 15 µm or less to meet the trend of miniaturization of electronic components.

In this case, as illustrated in the graph of FIG. 6, when the thickness of each of the second electrode layers 131b and 132b is 10 µm or less, it can be seen that the plating breakage rate is 0%. Accordingly, in order to implement a smaller electronic component 100, in the electronic component according to the exemplary embodiment in the present disclosure, the thickness of each of the second electrode layers 131b and 132b is 10 µm or less.

As set forth above, according to the exemplary embodiment in the present disclosure, it is possible to suppress the glass component forming the external electrode from eroding due to the plating solution applied to the surface of the external electrode.

In addition, according to the exemplary embodiment in the present disclosure, it is possible to prevent the plating solution from penetrating into the ceramic body while maintaining the adhesion between the ceramic body and the external electrode.

Further, according to the exemplary embodiment in the present disclosure, it is possible to suppress the Ni plating breakage and secure the durability and moisture resistance reliability of the electronic product.

While exemplary embodiments have been shown and described above, it will be apparent to those skilled in the art that modifications and variations could be made without departing from the scope of the present disclosure as defined by the appended claims.

What is claimed is:

1. An electronic component, comprising:
   a body including a plurality of dielectric layers and internal electrodes alternately stacked with the dielectric layers interposed therebetween; and
   an external electrode disposed outside the body, connected to the internal electrode, and including a conductive metal and glass,
   wherein the external electrode includes a first electrode layer connected to the internal electrode and a sintered second electrode layer disposed on the first electrode layer,
   an area proportion of the glass of the first electrode layer is greater than an area proportion of the glass of the sintered second electrode layer, and
   a thickness of the sintered second electrode layer is 6 µm or more.

2. The electronic component of claim 1, wherein the thickness of the sintered second electrode layer is 6.5 µm or more.

3. The electronic component of claim 1, wherein an area proportion of the glass in the sintered second electrode layer is 14% or less with respect to a sum of areas of the conductive metal and the glass included in the sintered second electrode layer.

4. The electronic component of claim 1, wherein an area proportion of the glass in the sintered second electrode layer is 7% or less with respect to a sum of areas of the conductive metal and the glass included in the sintered second electrode layer.

5. The electronic component of claim 2, wherein an area proportion of the glass in the sintered second electrode layer is 14% or less with respect to a sum of areas of the conductive metal and the glass included in the sintered second electrode layer.

6. The electronic component of claim 2, wherein an area proportion of the glass in the sintered second electrode layer is 7% or less with respect to a sum of areas of the conductive metal and the glass included in the sintered second electrode layer.

7. The electronic component of claim 1, wherein the body includes first and second surfaces facing each other in a first direction, third and fourth surfaces connected to the first and second surfaces and facing each other in a second direction, and fifth and sixth surfaces connected to the first to fourth surfaces and facing each other in a third direction, and
   the external electrode includes a first external electrode disposed on the third surface and portions of the first, second, fifth, and sixth surfaces of the body and a second external electrode disposed on the fourth surface and portions of the first, second, fifth, and sixth surfaces of the body.

8. The electronic component of claim 1, wherein the external electrode further includes a first plating layer disposed on the sintered second electrode layer.

9. The electronic component of claim 8, wherein the first plating layer includes a Ni plating layer.

10. The electronic component of claim 8, wherein the external electrode further includes a second plating layer disposed on the first plating layer and including a metal different from a metal included in the first plating layer.

11. The electronic component of claim 10, wherein the second plating layer includes a Sn plating layer.

12. The electronic component of claim 1, wherein the conductive metal includes Cu.

13. The electronic component of claim 1, wherein the conductive metal includes Ni.

14. The electronic component of claim 1, wherein the thickness of the sintered second electrode layer is 10 µm or less.

15. The electronic component of claim 1, wherein the glass in the first electrode layer includes one or more selected from the group consisting of silicon oxide, boron oxide, aluminum oxide, transition metal oxide, alkali metal oxide, and alkaline earth metal oxide.

16. The electronic component of claim 1, wherein the sintered second electrode layer comprises glass which includes one or more selected from the group consisting of silicon oxide, boron oxide, aluminum oxide, transition metal oxide, alkali metal oxide, and alkaline earth metal oxide.

* * * * *